(12) United States Patent
Tang (10) Patent No.: US 11,039,376 B2
(45) Date of Patent: Jun. 15, 2021

(54) INDICATION METHOD, DETECTION METHOD AND RELATED DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/846,228

(22) Filed: Apr. 10, 2020

(65) Prior Publication Data
US 2020/0245230 A1    Jul. 30, 2020

Related U.S. Application Data

(63) Continuation of application No. PCT/CN2018/076867, filed on Feb. 14, 2018.

(51) Int. Cl.
*H04W 48/10* (2009.01)
*H04J 11/00* (2006.01)
*H04L 5/00* (2006.01)

(52) U.S. Cl.
CPC ......... *H04W 48/10* (2013.01); *H04J 11/0073* (2013.01); *H04J 11/0076* (2013.01); *H04J 11/0079* (2013.01); *H04L 5/0092* (2013.01)

(58) Field of Classification Search
CPC .. H04W 48/10; H04J 11/0073; H04J 11/0079; H04J 5/0092; H04J 11/0076
See application file for complete search history.

(56) References Cited

U.S. PATENT DOCUMENTS

| 2013/0089067 | A1  | 4/2013  | Ji et al. |
| 2017/0064685 | A1  | 3/2017  | Rico Alvarino et al. |
| 2018/0337755 | A1* | 11/2018 | John Wilson ........ H04J 11/0076 |
| 2019/0200307 | A1* | 6/2019  | Si ........................ H04L 27/0014 |
| 2019/0222340 | A1* | 7/2019  | Kaikkonen .......... H04J 11/0073 |
| 2019/0254106 | A1* | 8/2019  | Wu .................... H04W 72/1294 |
| 2019/0289530 | A1* | 9/2019  | Ko ...................... H04L 27/2666 |
| 2019/0327123 | A1* | 10/2019 | Wang .................. H04J 11/0073 |

(Continued)

FOREIGN PATENT DOCUMENTS

| CN | 104081828 A | 10/2014 |
| CN | 104349464 A | 2/2015 |

(Continued)

OTHER PUBLICATIONS

3GPP TSG RAN WG1 Meeting AH 1801, Vancouver, Canada, Jan. 22-26, 2018—R1-1800508—OPPO, Discussion on synchronization raster indication (3 pages).

(Continued)

*Primary Examiner* — Peter P Chau
(74) *Attorney, Agent, or Firm* — Perkins Coie LLP (57) ABSTRACT

Provided in an implementation of the present disclosure are an indication method, a detection method, and a related device. In the present disclosure, a network device prevents a user equipment from performing a useless search in a frequency domain range in which a synchronization signal block (SSB) does not exist by means of indicating to the user equipment a frequency domain location of the SSB in a certain frequency domain range of the user equipment.

6 Claims, 4 Drawing Sheets

A user equipment receives an indication from a network device, and the indication is used for indicating a first frequency position of an SSB in a first frequency domain range — 501

The user equipment detects the SSB based on the indication — 502

(56) References Cited

U.S. PATENT DOCUMENTS

| | | | |
|---|---|---|---|
| 2020/0059875 A1* | 2/2020 | Takeda | H04W 74/08 |
| 2020/0068512 A1* | 2/2020 | Xue | H04W 72/005 |
| 2020/0092875 A1* | 3/2020 | Takeda | H04W 72/04 |
| 2020/0099493 A1* | 3/2020 | Ko | H04L 5/0007 |
| 2020/0146041 A1* | 5/2020 | Kim | H04J 11/00 |

FOREIGN PATENT DOCUMENTS

| | | | | |
|---|---|---|---|---|
| CN | 106961734 A | | 7/2017 | |
| CN | 107046721 A | | 8/2017 | |
| CN | 107615841 A | | 1/2018 | |
| CN | 109561506 A | | 4/2019 | |
| EP | 3644567 A1 | | 4/2020 | |
| WO | 2017217719 A1 | | 12/2017 | |
| WO | WO-2019120179 A1 | * | 6/2019 | H04W 56/00 |
| WO | WO-2019144387 A1 | * | 8/2019 | H04W 56/0015 |
| WO | WO-2019157657 A1 | * | 8/2019 | H04L 5/0053 |

OTHER PUBLICATIONS

3GPP TSG RAN WG1 Meeting AH 1801, Vancouver, Canada, Jan. 22-26, 2018—R1-1800893—Ericsson, On NR-PBCH (4 pages).

3GPP TSG RAN WG1 Meeting AH 1801, Vancouver, Canada, Jan. 22-26, 2018—R1-1801157 (R1-1801075)—Ericsson, Summary of 7.1.2.1 Remaining details on NR-PBCH (4 pages).

3GPP TSG RAN WG1 Meeting Ad-hoc#2—Qingdao, P.R. China Jun. 27-30, 2017—R1-1710507—Intel Corporation, NR PBCH Design (8 pages).

3GPP TSG RAN WG1 Meeting AH 180—Vancouver, Canada, Jan. 22-26\2018—R1-1800349—LG Electronics, Remaining Details on Synchronization signal (7 pages).

3GPP TSG-RAN WG4 Meeting Nr #2—Qingdao, China, Jun. 27-29, 2017—R4-1706501—AT&T, Min. system bandwidth and SS Block SCS (3 pages).

Supplementary European Search Report dated Dec. 16, 2020 of European Patent Application No. 18906020.5 (9 pages).

IPA, Examination Report No. 1 for Australian Patent Application No. 2018409146. dated Mar. 10, 2021. 5 pages.

CNIPA, First Office Action received for Chinese Patent Application No. 2021042802120300. dated May 6, 2021. 24 pages with English translation.

Guangdong OPPO Mobile Telecom, "Remaining details on multiple SS block transmission sin wideband CC" 3GPP TSG RAN WG1 Meeting # 90, RI-1713252. 5 pages.

Intel Corp. "NR PBCH Design" 3GPP TSG RAN WG1 Meeting Ad-1ioc#2R1-1710507. 8 pages.

* cited by examiner

401 — A network device sends an indication to a user equipment, and the indication is used for indicating a first frequency position of an SSB in a first frequency domain range

FIG. 4

501 — A user equipment receives an indication from a network device, and the indication is used for indicating a first frequency position of an SSB in a first frequency domain range 502 — The user equipment detects the SSB based on the indication

FIG. 5

Network device 600
- Transceiver
- Processor
- Memory
  - One or more programs

INDICATION METHOD, DETECTION METHOD AND RELATED DEVICE

CROSS REFERENCE TO RELATED APPLICATION

The present application is a continuation application of International PCT Application No. PCT/CN2018/076867 having an international filing date of Feb. 14, 2018. The present application claims the benefit of the above-identified application and the above-identified application is incorporated by reference herein in their entirety.

TECHNICAL FIELD

The present disclosure relates to a field of communication technology, in particular to an indication method, a detection method and a related device.

BACKGROUND

For a User Equipment (UE) of initial access, the user equipment needs to obtain a system message from a network device to access the network device. The system message includes remaining minimum system information (RMSI). RMSI may be indirectly obtained through a Physical Broadcast Channel (PBCH) of a Synchronization Signal Block (SSB).

At present, an initial search process (such as SSB search) takes too much time, which increases the time required for a user equipment to initially access a network device.

SUMMARY

Implementations of the present disclosure provide an indication method, a detection method and a related device.

In a first aspect, an implementation of the present disclosure provides an indication method, including: sending, by a network device, an indication to a user equipment, and the indication is used for indicating a first frequency domain location of an SSB within a first frequency domain range.

In a second aspect, an implementation of the present disclosure provides a detection method, including: receiving, by a user equipment, an indication from a network device, and the indication is used for indicating a first frequency domain location of an SSB within a first frequency domain range; detecting, by the user equipment, the SSB based on the indication.

In a third aspect, an implementation of the present disclosure provides a network device, including a processing unit and a communication unit, herein, the processing unit is configured to send an indication to a user equipment through the communication unit, and the indication is used for indicating a first frequency domain position of an SSB within a first frequency domain range.

In a fourth aspect, an implementation of the present disclosure provides a user equipment, including a processing unit and a communication unit, herein, the processing unit is configured to receive an indication from a network device through the communication unit, the indication is used for indicating a first frequency domain position of an SSB within a first frequency domain range; the processing unit is further configured to detect the SSB based on the indication.

In a fifth aspect, an implementation of the present disclosure provides a network device which includes one or more processors, one or more memories, one or more transceivers, and one or more programs. The one or more programs are stored in the one or more memories and configured to be executed by the one or more processors. The programs include instructions for performing acts in the method as described in the first aspect.

In a sixth aspect, an implementation of the present disclosure provides a user equipment which includes one or more processors, one or more memories, one or more transceivers, and one or more programs. The one or more programs are stored in the one or more memories and configured to be executed by the one or more processors. The programs include instructions for performing acts in the method as described in the second aspect.

In a seventh aspect, an implementation of the present disclosure provides a computer readable storage medium storing a computer program for electronic data interchange. The computer program causes a computer to execute parts or all of the acts described in the method of the first aspect.

In an eighth aspect, an implementation of the present disclosure provides a computer readable storage medium storing a computer program for electronic data interchange. The computer program causes a computer to execute parts or all of the acts described in the method of the second aspect.

In a ninth aspect, an implementation of the present disclosure provides a computer program product. The computer program product includes a non-transitory computer readable storage medium storing a computer program, and the computer program is operable to cause a computer to execute parts or all of the acts described in the method of the first aspect. The computer program product may be a software installation package.

In a tenth aspect, an implementation of the present disclosure provides a computer program product. The computer program product includes a non-transitory computer readable storage medium storing a computer program, and the computer program is operable to cause a computer to execute parts or all of the acts described in the method of the second aspect. The computer program product may be a software installation package.

These aspects and other aspects of the present disclosure will be more easily understood from following descriptions of the implementations.

BRIEF DESCRIPTION OF DRAWINGS

To more clearly explain the technical solutions in implementations or the background technology of the present disclosure, the drawings referred to in the implementations or the background technology of the present disclosure are explained below.

DETAILED DESCRIPTION

Terminologies used in implementations of the present disclosure are only for the purpose of explaining specific implementations of the present disclosure, and are not intended to limit the present disclosure.

Terms "first", "second", "third" and "fourth", or the like in the specification, claims and drawings of the present disclosure are used to distinguish different objects and not used to describe a specific order. In addition, terms "include" and "have" and any variations thereof are intended to cover non-exclusive inclusion.

Figure 1A:
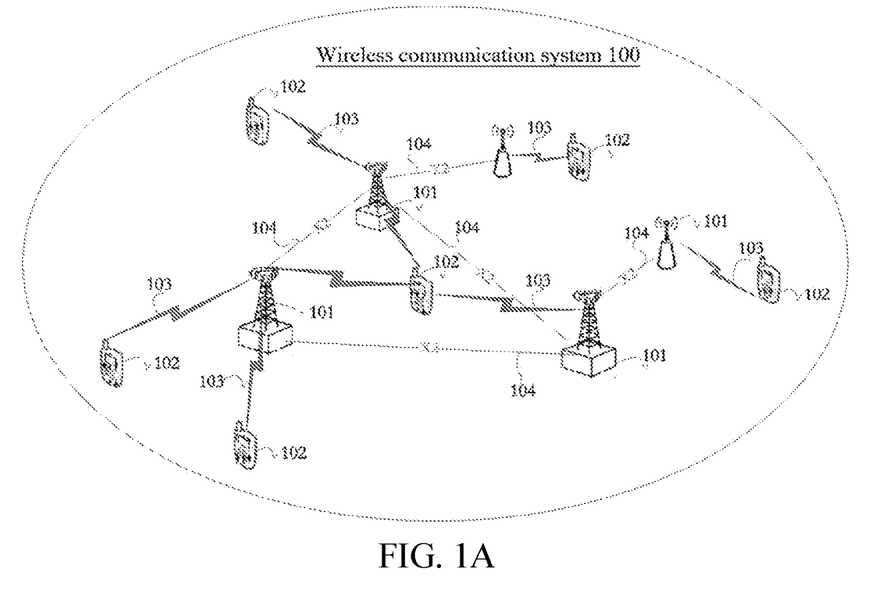
FIG. 1A is a schematic diagram of architecture of a wireless communication system provided by the present disclosure.

FIG. 1A shows a wireless communication system involved in the present disclosure. The wireless communication system is not limited to a Long Term Evolution (LTE) system, or may be the fifth generation mobile communication (5G) system evolved in the future, a New Radio (NR) system, a Machine to Machine (M2M) system, or the like. As shown in FIG. 1A, a wireless communication system 100 may include one or more network devices 101 and one or more user equipment 102.

The network device 101 may be a base station, which may be used for communicating with one or more user equipment or may be used for communicating with one or more base stations with partial functions of the user equipment (for example, communication between a macro base station and a micro base station such as an access point). The base station may be a base transceiver station (BTS) in a time division synchronous code division multiple access (TD-SCDMA) system, or an evolutional node B (eNB) in an LTE system, or a base station in the 5G system or the NR system. In addition, the base station may be an Access Point (AP), a transport point (TRP), a Central Unit (CU), or other network entities, and may include parts or all of functions of the above network entities.

The user equipment 102 may be distributed throughout a whole wireless communication system 100, and may be stationary, or mobile. In some implementations of the present disclosure, the user equipment 102 may be a mobile device, a mobile station, a mobile unit, an M2M terminal, a wireless unit, a remote unit, a user agent, a mobile client, etc.

The network device 101 may be used for communicating with the user equipment 102 through a wireless interface 103 under control of a network device controller (not shown). In some implementations, the network device controller may be a part of a core network, or may be integrated into the network device 101. The network device 101 and another network device 101 may also communicate with each other directly or indirectly through a backhaul interface 104 (e.g., an X2 interface).

Figure 1B:
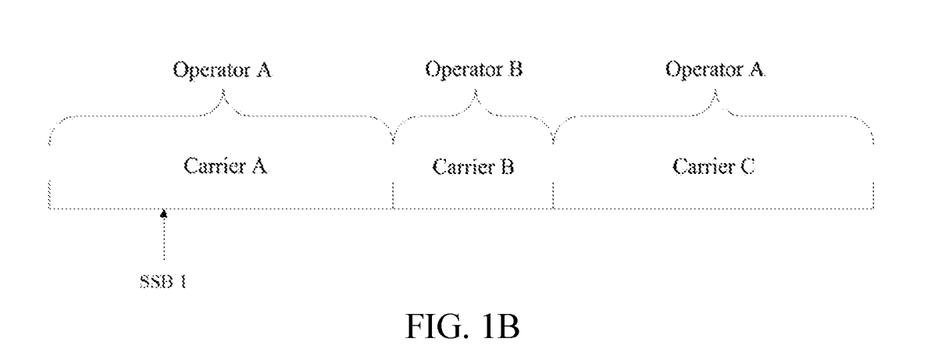
FIG. 1B is a schematic diagram of frequency domain resource allocation provided by an implementation of the present disclosure.

Frequency domain resources are allocated among various operators, and different frequency domain resources under a band may be allocated to different operators. As shown in FIG. 1B below, carrier A and carrier C are assigned to operator A, and carrier B is assigned to operator B. If a user equipment searches for SSB1 on the carrier A but the SSB1 is not associated with RMSI, a network device of the operator A indicates a frequency domain location of a cell defining SSB through the PBCH in the SSB1. If the SSB on the carrier A can indicate the frequency domain location of the cell defining SSB on the carrier A to carrier C, and since the carrier B is a carrier used by the operator B, the frequency domain location of the cell defining SSB contained in the carrier B will not be indicated by the network device of the carrier A, then there is no SSB associated with RMSI that a user equipment needs to search for in the frequency domain resource where the carrier B is located. If a user equipment searches in a resource where the carrier B is located, it will result in that the user equipment makes useless searches in a frequency domain range where SSB transmission does not exist, increasing the time required for an initial search process of the user equipment, and further increasing the time required for the user equipment to initially access the network device.

It may be seen that in the present disclosure, the network device indicates a frequency domain position of an SSB in some frequency domain range to the user equipment, thus avoiding useless search by the user equipment in the frequency domain range where the SSB does not exist, speeding up an initial search process of the user equipment, further reducing a power consumption in the initial search process, and facilitating the user equipment to search for SSBs in the frequency domain ranges of different operators.

It should be noted that the wireless communication system 100 shown in FIG. 1A is only for more clearly explaining the technical solutions of the present disclosure, and does not constitute a limitation to the present disclosure. Those of ordinary skill in the art should know that with evolution of network architecture and emergence of new service scenarios, the technical solutions provided by the present disclosure are also applicable to similar technical problems.

Figure 2:
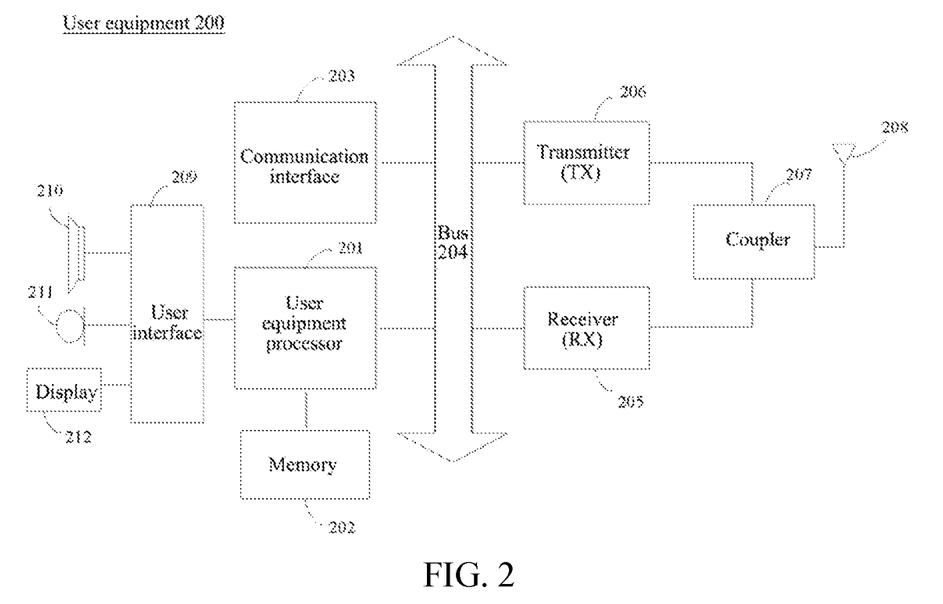
FIG. 2 is a schematic structural diagram of a user equipment provided by an implementation of the present disclosure.

Refer to FIG. 2, which shows a user equipment 200 according to some implementations of the present disclosure. As shown in FIG. 2, the user equipment 200 may include one or more user equipment processors 201, a memory 202, a communication interface 203, a receiver 205, a transmitter 206, a coupler 207, an antenna 208, a user interface 202, and input and output modules (including an audio input and output module 210, a key input module 211, a display 212, etc.). These components may be connected through a bus 204 or other modes, for example, in FIG. 2, the components are connected through the bus.

Herein, the communication interface 203 may be used for communication of the user equipment 200 with other communication devices, such as a network device. The network device may be the network device 300 shown in FIG. 3. The communication interface 203 may be a communication interface of LTE (4G), or may be a communication interface of 5G or new radio in the future. Not limited to a wireless communication interface, the user equipment 200 may be configured with a wired communication interface 203, such as a Local Access Network (LAN) interface.

The transmitter 206 may be used for performing transmission processing such as signal modulation on signals output by the user equipment processor 201. The receiver 205 may be used for performing reception processing such as signal demodulation on mobile communication signals received by the antenna 208. In some implementations of the present disclosure, the transmitter 206 and the receiver 205 may be considered as one wireless modem. In the user equipment 200, both the number of transmitters 206 and the number of receivers 205 may be one or more. The antenna 208 may be used for converting electromagnetic energy in a transmission line into electromagnetic waves in free spacing, or converting electromagnetic waves in the free spacing into electromagnetic energy in the transmission line. The coupler 207 is used for dividing the mobile communication signals received by the antenna 208 into multiple channels and distributing them to multiple receivers 205.

In addition to the transmitter 206 and receiver 205 shown in FIG. 2, the user equipment 200 may also include other communication components, such as, a GPS module, a Bluetooth module, a Wireless Fidelity (Wi-Fi) module, and the like. Not limited to the wireless communication signals described above, the user equipment 200 may also support other wireless communication signals, such as, satellite signals, short wave signals, and the like. Not limited to the wireless communication, the user equipment 200 may also be configured with a wired network interface (e.g., a LAN interface) to support wired communication.

The input and output module may be used for implementing an interaction between the user equipment 200 and a user/external environment. The input and output module may mainly include an audio input and output module 210, a key input module 211, and a display 212, etc. The input and output module may further include a camera, a touch screen, and a sensor, etc. All input and output modules communicate with the user equipment processor 201 through the user interface 209.

The memory 202 is coupled to the terminal processor 201, and used for storing various software programs and/or multiple sets of instructions. The memory 202 may include a high-speed random access memory, or may include a non-volatile memory, such as, one or more disk storage devices, flash memory devices, or other non-volatile solid-state storage devices. The memory 202 may store an operating system (hereinafter referred to as a system), such as, an embedded operating system, e.g., ANDROID, IOS, WINDOWS, or LINUX. The memory 202 may also store a network communication program that may be used for communication among one or more additional devices, one or more user equipment, and one or more network devices. The memory 202 may also store a user interface program that may vividly display contents of application programs through a graphical operating interface, and receive user's control operations for the application programs through input controls, such as a menu, a dialog box, a key, etc.

In some implementations of the present disclosure, the memory 202 may be used for storing an implementation program at the user equipment 200 side for the detection method provided by one or more implementations of the present disclosure. An implementation of the detection method provided by one or more implementations of the present disclosure is illustrated by referring to following method implementations.

In some implementations of the present disclosure, the user equipment processor 201 may be used for reading and executing computer readable instructions. The user equipment processor 201 may be used for calling a program stored in the memory 202, such as, an implementation program at the user equipment 200 side of the detection method provided by one or more implementations of the present disclosure, and executing instructions contained in the program.

It should be noted that the user equipment 200 shown in FIG. 2 is only an implementation of the implementations of the present disclosure. In actual application, the user equipment 200 may also include more or fewer components, which is not limited here.

Figure 3:
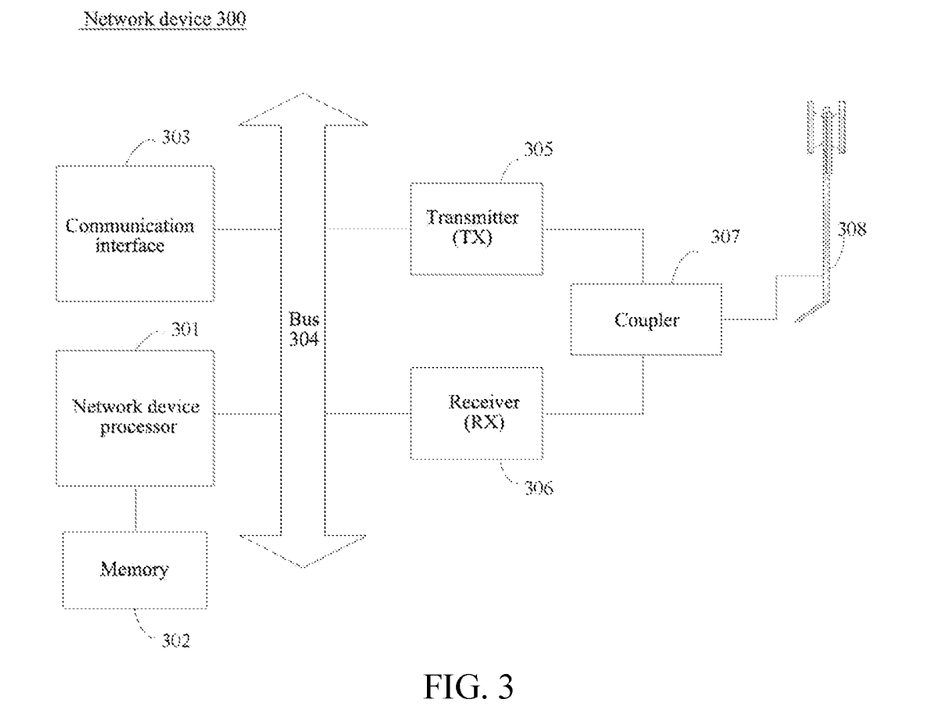
FIG. 3 is a schematic structural diagram of a network device provided by an implementation of the present disclosure.

Refer to FIG. 3, FIG. 3 shows a network device 300 provided by some implementations of the present disclosure. As shown in FIG. 3, the network device 300 may include one or more network device processors 301, a memory 302, a communication interface 303, a transmitter 305, a receiver 306, a coupler 307, and an antenna 308. These components may be connected through a bus 304 or other modes. For example, in FIG. 4 the components are connected through the bus.

Herein, the communication interface 303 may be used for communication of the network device 300 with other communication devices, such as, user equipment or other network devices. The user equipment may be the user equipment 200 shown in FIG. 2. The communication interface 303 may be a communication interface of LTE (4G), or may be a communication interface of 5G or new radio in the future. Not limited to the wireless communication interface, the network device 300 may be configured with a wired communication interface 303 to support wired communication. For example, backhaul links between one network device 300 and other network devices 300 may be wired communication connections.

The transmitter 305 may be used for performing transmission processing such as signal modulation on signals output by the network device processor 301. The receiver 306 may be used for performing reception processing such as signal demodulation on mobile communication signals received by the antenna 308. In some implementations of the present disclosure, the transmitter 305 and the receiver 306 may be considered as one wireless modem. In the network device 300, both the number of transmitters 305 and the number of receivers 306 may be one or more. The antenna 308 may be used for converting electromagnetic energy in a transmission line into electromagnetic waves in free spacing, or converting electromagnetic waves in the free spacing into electromagnetic energy in the transmission line. The coupler 307 is used for dividing the mobile communication signals into multiple channels and distributing them to multiple receivers 306.

The memory 302 is coupled to the network device processor 301, and used for storing various software programs and/or multiple sets of instructions. The memory 302 may include a high-speed random access memory, or may include a non-volatile memory, such as, one or more disk storage devices, flash memory devices, or other non-volatile solid-state storage devices. The memory 302 may store an operating system (hereinafter referred to as a system), such as an embedded operating system, e.g., uCOS, VxWorks, or RTLinux. The storage 402 may also store a network communication program that may be used for communication among one or more additional devices, one or more terminal devices, and one or more network devices.

The network device processor 301 may be used for managing wireless channels, implementing calling and establishing and removing communication links, and providing cell handover control for users in a control area. The network device processor 301 may include an Administration Module/Communication Module (AM/CM, used as a center for voice path switch and information exchange), a Basic Module, (BM, used for completing call processing, signaling processing, Radio resource management, wireless link management and circuit maintenance functions), a Transcoder and Submultiplexer (TCSM, used for completing multiplexing and demultiplexing and code transformation functions), etc.

In an implementation of the present disclosure, the memory 302 may be used for storing an implementation program at a network device 300 side for the indication method provided by one or more implementations of the present disclosure. An implementation of the indication method provided by one or more implementations of the present disclosure is illustrated by referring to following method implementations.

In implementations of the present disclosure, the network device processor 301 may be used for reading and executing computer readable instructions. The network device processor 301 may be used for calling a program stored in the memory 302, such as an implementation program at the network device 300 side of the indication method provided by one or more implementations of the present disclosure, and executing instructions contained in the program.

It should be noted that the network device 300 shown in FIG. 3 is only an implementation of implementations of the present disclosure. In actual application, the network device 300 may include more or fewer components, which is not limited here.

Based on the implementations respectively corresponding to the wireless communication system 100, the user equipment 200 and the network device 300, an implementation of the present disclosure provides an indication method.

Figure 4:
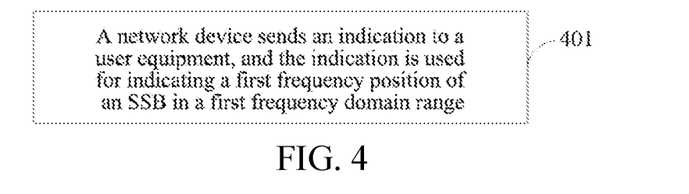
FIG. 4 is a schematic flowchart of an indication method provided by an implementation of the present disclosure.

Referring to FIG. 4, which is a schematic flowchart of an indication method provided by an implementation of the present disclosure, the method includes the following act.

Act 401: a network device sends an indication to a user equipment, and the indication is used for indicating a first frequency domain location of an SSB within a first frequency domain range.

Further, the SSB is associated with RMSI.

The RMSI is carried on a Physical Downlink Shared Channel (PDSCH), and downlink control information (DCI) of PDSCH is carried on a Physical Downlink Control Channel (PDCCH). A time-frequency resource location where the PDCCH is located is indicated by a Physical Broadcast Channel (PBCH), and the PBCH also indicates whether the SSB where the PBCH is located is associated with the RMSI. Therefore, the RMSI may be obtained through the SSB associated with the RMSI.

Frequency domain resources are allocated among various operators, and different frequency domain resources under one band may be allocated to different operators. As shown in FIG. 1B below, carrier A and carrier C are assigned to operator A, and carrier B is assigned to operator B. If a user equipment searches for SSB1 on the carrier A but the SSB1 is not associated with the RMSI, a network device of operator A indicates a frequency domain location of a cell defining SSB through the PBCH in the SSB1. If the SSB on the carrier A can indicate the frequency domain location of the cell defining SSB on the carrier A to carrier C, and since the carrier B is a carrier used by the operator B, the frequency domain location of the cell defining SSB contained in the carrier B will not be indicated by the network device of operator A, then there is no SSB associated with the RMSI that the user equipment needs to search for in the frequency domain resource where the carrier B is located. If the user equipment searches in the resource where the carrier B is located, it will result in that the user equipment performs useless searches in a frequency domain range where SSB transmission does not exist, increasing the time required for an initial search process of the user equipment, and further increasing the time required for the user equipment to initially access the network device.

It may be seen that in the present disclosure, the network device indicates a frequency domain position of the SSB in some frequency domain range to the user equipment, thus avoiding useless search by the user equipment in the frequency domain range where the SSB does not exist, speeding up an initial search process of the user equipment, further reducing a power consumption in the initial search process, and facilitating the user equipment to search for SSBs in frequency domain ranges of different operators.

In one implementation of the present disclosure, the network device sends an indication to the user equipment, and the indication is used for indicating a first frequency domain location of the SSB within a first frequency domain range, including: the network device sends a first message to the user equipment, and the first message is used for indicating the first frequency domain range; the network device sends a second message to the user equipment, and the second message is used for indicating the first frequency domain location of the SSB.

The first message and the second message may be carried in downlink data sent by the network device to the user equipment, or may be carried in a downlink message sent by the network device to the user equipment, etc., and is not limited here.

The network device may send the first message and the second message together to the user equipment, or may send the first message and the second message separately to the user equipment.

In one implementation of the present disclosure, the network device carries the second message in a first information field in a physical broadcast channel (PBCH), and the first information field includes an information field of a Control Resource Set (CORESET) of the RMSI.

The PBCH includes an information field of the CORESET of the RMSI. In the prior art, this information field is an information field for indicating a frequency domain position of an SSB. In the present disclosure, since the SSB where the PBCH is located is not associated with the RMSI, this information field of the PBCH corresponding to the SSB that is not associated with the RMSI is an idle field. Therefore, in the present disclosure, the network device uses this information field to indicate the frequency domain location of the SSB associated with the RMSI.

In one implementation of the present disclosure, the network device carries the first message in a second information field besides the first information field in the physical broadcast channel (PBCH).

In one implementation of the present disclosure, the second information field includes at least one of the following: a reserved value in a PRB grid offset information field, subcarrier spacing (SCS) information of RMSI, cell access prohibition indication information (Cell Barred), intra-frequency reselection information (IntraFreq Reselection).

The PBCH carries information which is used for indicating whether the SSB where the PBCH is located is associated with the RMSI. In the prior art, the network device may indicate an absence of RMSI through the reserved value in the PRB grid offset information field of PBCH. Below 6 MHZ, the PRB grid offset information field includes 5 bits, and the 5 bits have a total of 1 to 32 coded bits. Of these 32 coded bits, 24 coded bits have been used and 8 coded bits remain idle.

Herein, the RMSI SCS is information for receiving RMSI and for a subsequent random access and for receiving other system information. If the SSB where the PBCH is located is not associated with the RMSI, the RMSI SCS of the PBCH corresponding to the SSB that is not associated with the RMSI is idle, so in this case, the RMSI SCS may be used for indicating other information.

Herein, the Cell Barred is used for indicating whether the cell permits access. If the SSB where the PBCH is located is not associated with the RMSI, the Cell Barred of the PBCH corresponding to the SSB that is not associated with the RMSI is idle, so in this case, the Cell Barred may be used for indicating other information.

Herein, the IntraFreq Reselection is used for indicating whether intra-frequency reselection is allowed. If the SSB where the PBCH is located is not associated with the RMSI, the IntraFreq Reselection of the PBCH corresponding to the SSB that is not associated with the RMSI is idle, so in this case, the IntraFreq Reselection may be used for indicating other information.

It may be seen that when the SSB where the PBCH is located is not associated with the RMSI, the network device may use at least one of the reserved value in the PRB grid offset information field, the RMSI SCS, the Cell Barred, and the IntraFreq Reselection to indicate the frequency domain range.

In one implementation of the present disclosure, the second message includes frequency domain position information, the frequency domain position information includes position information, and the frequency domain position information indicates an absolute position of a synchronization raster of the SSB within the first frequency domain range; alternatively, the frequency domain position information includes a frequency domain offset, and the frequency domain offset is a spacing between the synchronization raster where the first frequency domain position is located and the synchronization raster corresponding to the SSB where the PBCH is located.

The above spacing may be the number of synchronization rasters, or a width in the frequency domain, or the like, and is not limited here.

Based on the implementations respectively corresponding to the above mentioned wireless communication system 100, the user equipment 200 and the network device 300, an implementation of the present disclosure provides a detection method.

Figure 5:
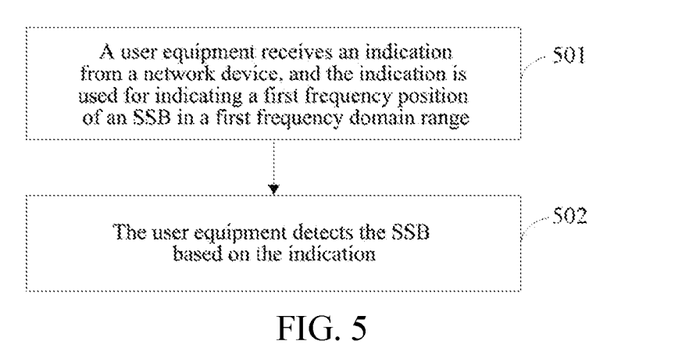
FIG. 5 is a schematic flowchart of a detection method provided by an implementation of the present disclosure.

Referring to FIG. 5, which shows a schematic flowchart of an indication method provided by an implementation of the present disclosure, the method includes following acts.

Act 501: a user equipment receives an indication from a network device, and the indication is used for indicating a first frequency domain location of an SSB within a first frequency domain range.

Act 502: the user equipment detects the SSB based on the indication.

Further, the SSB is associated with RMSI.

Herein, the RMSI is carried on a PDSCH, DCI of the PDSCH is carried on a PDCCH, a time-frequency resource location where the PDCCH is located is indicated by a PBCH, and the PBCH also indicates whether the SSB where the PBCH is located is associated with the RMSI. Therefore, the RMSI may be obtained through the SSB associated with the RMSI.

Frequency domain resources are allocated among various operators, and different frequency domain resources under one band may be allocated to different operators. As shown in FIG. 1B below, carrier A and carrier C are assigned to operator A, and carrier B is assigned to operator B. If a user equipment searches for SSB1 on carrier A but the SSB1 is not associated with RMSI, a network device of the operator A indicates a frequency domain location of a cell defining SSB through the PBCH in the SSB1. If the SSB on carrier A can indicate the frequency domain location of the cell defining SSB on the carrier A to carrier C, and since the carrier B is a carrier used by the operator B, the frequency domain location of the cell defining SSB contained in the carrier B will not be indicated by the network device of operator A, then there is no SSB associated with RMSI that the user equipment needs to search for in the frequency domain resource where the carrier B is located. If the user equipment searches in the resource where the carrier B is located, it will result in that the user equipment performs useless searches in a frequency domain range where SSB transmission does not exist, increasing the time required for the initial search process of the user equipment, and further increasing the time required for the user equipment to initially access the network device.

In a specific implementation, the user equipment detects the SSB based on the indication, including: when SSB detection is performed, the user equipment directly detects the SSB at the first frequency domain position within the first frequency domain range.

It may be seen that in the present disclosure, the network device indicates a frequency domain position of an SSB in some frequency domain range to the user equipment, thus avoiding useless search by the user equipment in the frequency domain range where the SSB does not exist, speeding up an initial search process of the user equipment, further reducing a power consumption in the initial search process, and facilitating the user equipment to search SSBs in frequency domain ranges of different operators.

In one implementation of the present disclosure, the user equipment receives the indication from the network device, and the indication is used for indicating the first frequency domain position of the SSB within the first frequency domain range, including: the user equipment receives a first message from the network device, and the first message is used for indicating the first frequency domain range; the user equipment receives a second message from the network device, and the second message is used for indicating the first frequency domain location of the SSB.

In one implementation of the present disclosure, the network device carries the second message in a first information field in a physical broadcast channel (PBCH), and the first information field includes an information field of a CORESET of the RMSI.

The PBCH includes an information field of the CORESET of the RMSI. In the prior art, this information field is an information field for indicating a frequency domain position of an SSB. In the present disclosure, since the SSB where the PBCH is located is not associated with the RMSI, this information field of the PBCH corresponding to the SSB that is not associated with the RMSI is an idle field. Therefore, in the present disclosure, the network device uses this information field to indicate the frequency domain location of the SSB associated with the RMSI.

In one implementation of the present disclosure, the network device carries the first message in a second information field besides the first information field in the physical broadcast channel (PBCH).

In one implementation of the present disclosure, the second information field includes at least one of the following: a reserved value in a physical resource block (PRB) grid offset information field, subcarrier spacing (SCS) information of RMSI, cell access prohibition indication information, and intra-frequency reselection information.

Herein, the PBCH carries information for indicating whether the SSB where the PBCH is located is associated with RMSI. In the prior art, the network device may indicate an absence of RMSI through the reserved value in the PRB grid offset information field of PBCH. Below 6 MHZ, the PRB grid offset information field includes 5 bits, and the 5 bits have a total of 1 to 32 coded bits. Of these 32 coded bits, 24 coded bits have been used and 8 coded bits remain idle.

Herein, the RMSI SCS is information for receiving the RMSI and for a subsequent random access and for receiving other system information. If the SSB where the PBCH is located is not associated with the RMSI, the RMSI SCS of the PBCH corresponding to the SSB that is not associated with the RMSI is idle, so in this case, the RMSI SCS may be used for indicating other information.

Herein, the Cell Barred is used for indicating whether the cell permits access. If the SSB where the PBCH is located is not associated with the RMSI, the Cell Barred of the PBCH corresponding to the SSB that is not associated with the RMSI is idle, so in this case, the Cell Barred may be used for indicating other information.

Herein, the IntraFreq Reselection is used for indicating whether intra-frequency reselection is allowed. If the SSB where the PBCH is located is not associated with the RMSI, the IntraFreq Reselection of the PBCH corresponding to the SSB that is not associated with the RMSI is idle, so in this case, the IntraFreq Reselection may be used for indicating other information.

It may be seen that when the SSB where the PBCH is located is not associated with the RMSI, the network device may use at least one of the reserved value in the PRB grid offset information field, the RMSI SCS, the Cell Barred, and the IntraFreq Reselection to indicate the frequency domain range.

In one implementation of the present disclosure, the second message includes frequency domain position information, the frequency domain position information includes position information, and the frequency domain position information indicates an absolute position of a synchronization raster of the SSB within the first frequency domain range. Alternatively, the frequency domain position information includes a frequency domain offset, and the frequency domain offset is a spacing between the synchronization raster where the first frequency domain position is located and the synchronization raster corresponding to the SSB where the PBCH is located.

Herein, the above spacing may be the number of synchronization rasters, a width in frequency domain, or the like, and is not limited here.

Figure 6:
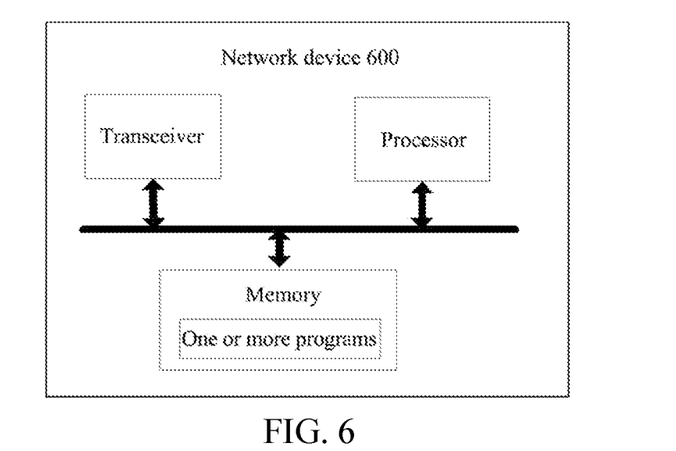
FIG. 6 is a schematic structural diagram of another network device provided by an implementation of the present disclosure.

Referring to FIG. 6, which shows a network device 600 provided by an implementation of the present disclosure, the network device 600 includes one or more processors, one or more memories, one or more transceivers, and one or more programs.

The one or more programs are stored in the one or more memories, and configured to be executed by the one or more processors.

The one or more programs include instructions for performing the following acts: sending an indication to a user equipment, the indication is used for indicating a first frequency domain location of an SSB within a first frequency domain range.

In one implementation of the present disclosure, the SSB is associated with RMSI.

In one implementation of the present disclosure, in an aspect of sending the indication to the user equipment and the indication is used for indicating the first frequency domain position of the SSB in the first frequency domain range, the program includes instructions used for performing the following acts: sending a first message to the user equipment, the first message is used for indicating the first frequency domain range; and sending a second message to the user equipment, the second message is used for indicating the first frequency domain location of the SSB.

In one implementation of the present disclosure, the network device carries the second message in a first information field in a PBCH, the first information field includes an information field of a CORESET of the RMSI.

In one implementation of the present disclosure, the network device carries the first message in a second information field besides the first information field in the PBCH.

In one implementation of the present disclosure, the second information field includes at least one of the following: a reserved value in a physical resource block PRB grid offset information field, subcarrier spacing (SCS) information of RMSI, cell access prohibition indication information (Cell Barred), and intra-frequency reselection information (IntraFreq Reselection).

In one implementation of the present disclosure, the second message includes frequency domain position information, the frequency domain position information includes position information, and the frequency domain position information indicates an absolute position of a synchronization raster of the SSB within the first frequency domain range; optionally, the frequency domain position information includes a frequency domain offset, and the frequency domain offset is a spacing between the synchronization raster where the first frequency domain position is located and the synchronization raster corresponding to the SSB where the PBCH is located.

It should be noted that specific implementations of the content described in the implementation may refer to those of the above indication method and will not be described herein.

Figure 7:
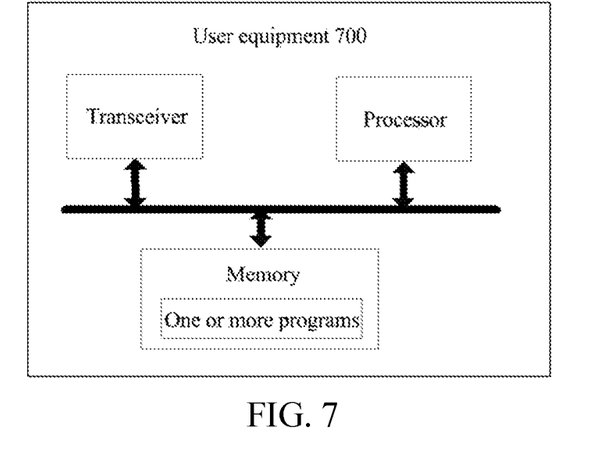
FIG. 7 is a schematic structural diagram of another user equipment provided by an implementation of the present disclosure.

Referring to FIG. 7, which shows a user equipment 700 provided by an implementation of the present disclosure, the user equipment 700 includes one or more processors, one or more memories, one or more transceivers, and one or more programs.

The one or more programs are stored in the one or more memories, and configured to be executed by the one or more processors.

The one or more programs include instructions for performing the following acts: receiving an indication from a network device, the indication is used for indicating a first frequency domain location of an SSB within a first frequency domain range; and detecting the SSB based on the indication.

In one implementation of the present disclosure, the SSB is associated with RMSI.

In one implementation of the present disclosure, in an aspect of receiving the indication from the network device for indicating the first frequency domain position of the SSB in the first frequency domain range, the program includes instructions for performing the following acts: receiving a first message from the network device, the first message is used for indicating the first frequency domain range; and receiving a second message from the network device, the second message is used for indicating the first frequency domain location of the SSB.

In one implementation of the present disclosure, the network device carries the second message in a first information field in a PBCH, and the first information field includes an information field of a CORESET of the RMSI.

In one implementation of the present disclosure, the network device carries the first message in a second information field besides the first information field in the PBCH.

In one implementation of the present disclosure, the second information field includes at least one of the following: a reserved value in a physical resource block (PRB) grid offset information field, subcarrier spacing (SCS) information of RMSI, cell access prohibition indication information, and intra-frequency reselection information.

In one implementation of the present disclosure, the second message includes frequency domain position information, the frequency domain position information includes position information, and the frequency domain position information indicates an absolute position of a synchronization raster of the SSB within the first frequency domain range; optionally, the frequency domain position information includes a frequency domain offset, and the frequency domain offset is a spacing between the synchronization raster where the first frequency domain position is located and the synchronization raster corresponding to the SSB where the PBCH is located.

It should be noted that specific implementations of the content described in the implementation may refer to those of the above detection method and will not be described herein.

Figure 8:
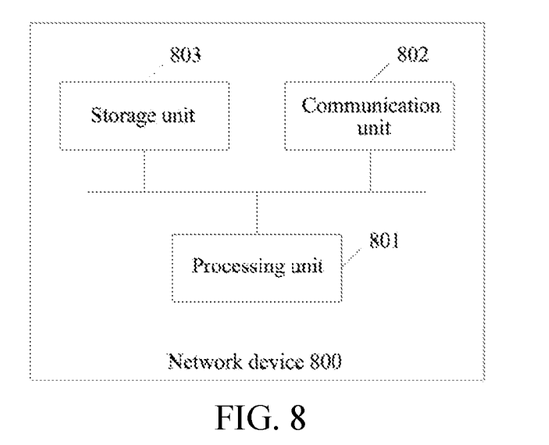
FIG. 8 is a schematic structural diagram of another network device provided by an implementation of the present disclosure.

Referring to FIG. 8, which shows a network device 800 provided by an implementation of the present disclosure, the network device 800 includes a processing unit 801, a communication unit 802 and a storage unit 803.

The processing unit 801 is configured to send an indication to a user equipment through the communication unit 802, herein the indication is used for indicating a first frequency domain position of an SSB within a first frequency domain range.

In one implementation of the present disclosure, the SSB is associated with RMSI.

In one implementation of the present disclosure, in an aspect of sending the indication to the user equipment through the communication unit 802 for indicating the first frequency domain position of the SSB within a first frequency domain range, the processing unit 801 sends a first message to the user equipment through the communication unit 802, herein the first message is used for indicating the first frequency domain range; and sends a second message to the user equipment through the communication unit 802, herein the second message is used for indicating the first frequency domain location of the SSB.

In one implementation of the present disclosure, the network device carries the second message in a first information field in a PBCH, and the first information field includes an information field of a CORESET of the RMSI.

In one implementation of the present disclosure, the network device carries the first message in a second information field besides the first information field in the PBCH.

In one implementation of the present disclosure, the second information field includes at least one of the following: a reserved value in a physical resource block (PRB) grid offset information field, subcarrier spacing (SCS) information of RMSI, cell access prohibition indication information, and intra-frequency reselection information.

In one implementation of the present disclosure, the second message includes frequency domain position information, the frequency domain position information includes position information, and the frequency domain position information indicates an absolute position of a synchronization raster of the SSB within the first frequency domain range; optionally, the frequency domain position information includes a frequency domain offset, and the frequency domain offset is a spacing between the synchronization raster where the first frequency domain position is located and the synchronization raster corresponding to the SSB where the PBCH is located.

The processing unit 801 may be a processor or a controller (e.g., the processing unit 701 may be a Central Processing Unit (CPU), a general-purpose processor, a Digital Signal Processor (DSP), an Application-Specific Integrated Circuit (ASIC), a Field Programmable Gate Array (FPGA), or another programmable logic device, a transistor logic device, a hardware component, or any combination thereof. The processing unit 801 may implement or execute various illustrative logical blocks, modules, and circuits described in combination with disclosed contents of the present disclosure. Or, the processor may be a combination that implements computing functions, e.g., a combination that includes one or more microprocessors, a combination of a DSP and a microprocessor, etc.). The communication unit 802 may be a transceiver, a transceiving circuit, a radio chip, a communication interface, etc., and the storage unit 803 may be a memory.

When the processing unit 801 is a processor, the communication unit 802 is a communication interface, and the storage unit 803 is a memory, the network device relates to implementation of the present disclosure may the network device shown in FIG. 6.

Figure 9:
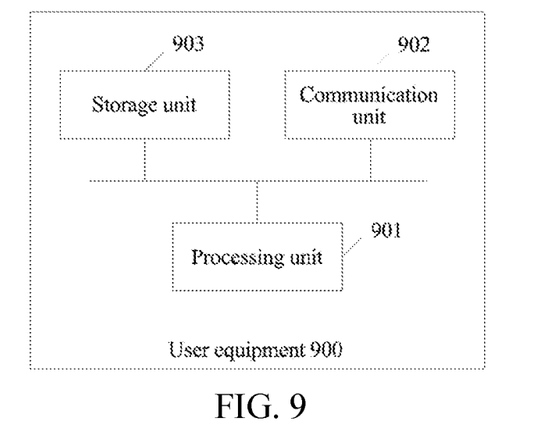
FIG. 9 is a schematic structural diagram of another user equipment provided by an implementation of the present disclosure.

Please refer to FIG. 9, FIG. 9 shows a user equipment 900 provided by an implementation of the present disclosure. The user equipment 900 includes a processing unit 901, a communication unit 902 and a storage unit 903.

The processing unit 901 is configured to receive an indication from a network device through the communication unit 902, herein the indication is used for indicating a first frequency domain location of the SSB within a first frequency domain range.

The processing unit 901 is further configured to detect an SSB based on the indication.

In one implementation of the present disclosure, the SSB is associated with RMSI.

In one implementation of the present disclosure, in an aspect of receiving the indication from the network device through the communication unit 902 for indicating the first frequency domain position of the SSB within the first frequency domain range, the processing unit 901 is configured to: receive a first message from the network device through the communication unit 902, herein the first message is used for indicating the first frequency domain range; and receive a second message from the network device through the communication unit 902, herein the second message is used for indicating the first frequency domain location of the SSB.

In one implementation of the present disclosure, the network device carries the second message in a first information field in a PBCH, and the first information field includes an information field of a CORESET of the RMSI.

In one implementation of the present disclosure, the network device carries the first message in a second information field besides the first information field in the PBCH.

In one implementation of the present disclosure, the second information field includes at least one of the following: a reserved value in a physical resource block PRB grid offset information field, subcarrier spacing (SCS) information of RMSI, cell access prohibition indication information, and intra-frequency reselection information.

In one implementation of the present disclosure, the second message includes frequency domain position information, the frequency domain position information includes position information, and the frequency domain position information indicates an absolute position of a synchronization raster of the SSB within the first frequency domain range; optionally, the frequency domain position information includes a frequency domain offset, and the frequency domain offset is a spacing between the synchronization raster where the first frequency domain position is located and the synchronization raster corresponding to the SSB where the PBCH is located.

The processing unit 901 may be a processor or a controller (e.g., a Central Processing Unit (CPU), a general-purpose processor, a Digital Signal Processor (DSP), An Application-Specific Integrated Circuit (ASIC), a Field Programmable Gate Array (FPGA), or another programmable logic device, a transistor logic device, a hardware component, or any combination thereof. The processing unit 901 may implement or execute various illustrative logical blocks, modules, and circuits described in combination with disclosed contents of the present disclosure. Or, the processor may be a combination that implements computing functions, e.g., a combination that includes one or more microprocessors, a combination of a DSP and a microprocessor, etc.). The communication unit 902 may be a transceiver, a transceiving circuit, a radio chip, a communication interface, etc., and the storage unit 903 may be a memory.

When the processing unit 901 is a processor, the communication unit 902 is a communication interface, and the storage unit 903 is a memory, the user equipment involved in the implementations of the present disclosure may be the user equipment shown in FIG. 7.

An implementation of the present disclosure further provides a computer readable storage medium. The computer readable storage medium stores a computer program for electronic data interchange, and the computer program causes a computer to perform parts or all of the acts described for the user equipment, the first network device or the second network device in the above method implementations.

An implementation of the present disclosure further provides a computer program product. The computer program product includes a non-transitory computer readable storage medium storing a computer program, and the computer program is operable to cause a computer to perform parts or all of the acts described for the user equipment, the first network device or the second network device in the above methods. The computer program product may be a software installation package.

The acts of the method or algorithm described in the implementations of the present disclosure may be implemented in hardware or may be implemented by a processor executing software instructions. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An exemplary storage medium is coupled to the processor such that the processor can read information from the storage medium, and write information to the storage medium. Of course, the storage medium may be a component of the processor. The processor and the storage medium may be located in an ASIC. In addition, the ASIC may be located in an access network device, a target network device, or a core network device. Or, the processor and the storage medium may act as separate components in the access network device, the target network device, or the core network device.

Those skilled in the art should realize that in one or more examples described above, the functions described in the implementations of the present disclosure may be implemented in whole or in parts through software, hardware, firmware, or any combination thereof. When the functions described in the implementations of the present disclosure are implemented through software, these functions may be implemented in whole or in parts in the form of a computer program product. The computer program product includes one or more computer instructions. When the computer program instructions are loaded and executed on a computer, the flows or functions according to the implementations of the present disclosure are generated in whole or in parts. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc.). The computer-readable storage medium may be any available medium that the computer can access, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The specific implementations described above have further explained in detail a purpose, a technical solution and a beneficial effect of implementations of the present disclosure. It should be understood that the above is only the specific implementations of implementations of the present disclosure, and is not used to limit the protection scope of implementations of the present disclosure. Any modification, equivalent substitution, improvement and the like, made on the basis of technical solutions of implementations of the present disclosure shall be included in the protection scope of implementations of the present disclosure.

What is claimed is:

1. An indication method, comprising:
    sending, by a network device, a first synchronization signal block (SSB) to a user equipment, the first SSB comprising a physical broadcast channel (PBCH), the first SSB being not associated with remaining minimum system information (RMSI),
    wherein the PBCH comprises an indication for indicating a first frequency domain position of a second SSB in a first frequency domain range,
    wherein the second SSB is associated with the RMSI, and
    wherein the indication comprises:
        a first message for indicating the first frequency domain range; and
        a second message for indicating the first frequency domain location of the second SSB.

2. The method of claim 1, wherein the network device sends the first message together with the second message.

3. A detection method, comprising:
receiving, by a user equipment, a first synchronization signal block (SSB) from a network device, the first SSB comprising a physical broadcast channel (PBCH), the first SSB being not associated with remaining minimum system information (RMSI), wherein the PBCH comprises an indication for indicating a first frequency domain location of a second SSB in a first frequency domain range, and wherein the second SSB is associated with the RMSI; and
detecting, by the user equipment, the second SSB based on the indication, wherein the indication comprises:
a first message for indicating the first frequency domain range; and
a second message for indicating the first frequency domain location of the second SSB.

4. The method of claim 3, wherein the first message and the second message are sent together by the network device.

5. A network device, comprising one or more processors, one or more memories, one or more transceivers, and one or more programs; wherein the one or more programs are stored in the one or more memories and configured to be executed by the one or more processors, and the one or more programs comprise instructions for executing following acts:
sending a first synchronization signal block (SSB) to a user equipment, the first SSB comprising a physical broadcast channel (PBCH), the first SSB being not associated with remaining minimum system information (RMSI),
wherein the PBCH comprises an indication for indicating a first frequency domain position of a second SSB in a first frequency domain range,
wherein the second SSB is associated with the RMSI, and
wherein the indication comprises:
a first message for indicating the first frequency domain range; and
a second message for indicating the first frequency domain location of the second SSB.

6. A user equipment comprising one or more processors, one or more memories, one or more transceivers, and one or more programs; wherein the one or more programs are stored in the one or more memories and configured to be executed by the one or more processors, and the one or more programs comprise instructions for performing following acts:
receiving a first synchronization signal block (SSB) from a network device, the first SSB comprising a physical broadcast channel (PBCH), the first SSB being not associated with remaining minimum system information (RMSI), wherein the PBCH comprises an indication for indicating a first frequency domain location of a second SSB in a first frequency domain range, and wherein the second SSB is associated with the RMSI; and
detecting the second SSB based on the indication, wherein the indication comprises:
a first message for indicating the first frequency domain range; and
a second message for indicating the first frequency domain location of the second SSB.

* * * * *